United States Patent

Rabow

[15] 3,705,360

[45] Dec. 5, 1972

[54] FREQUENCY MODULATION DEMODULATION SYSTEM

[72] Inventor: Gerald Rabow, Nutley, N.J.

[73] Assignee: International Telephone and Telegraph Corporation, Nutley, N.J.

[22] Filed: April 1, 1971

[21] Appl. No.: 130,502

Related U.S. Application Data

[63] Continuation of Ser. No. 827,183, May 23, 1969, abandoned.

[52] U.S. Cl. ..................329/110, 325/349, 325/487, 329/122

[51] Int. Cl. ..............................................H03d 3/00

[58] Field of Search ......325/349, 434, 487; 329/110, 329/112, 122, 150

[56] References Cited

UNITED STATES PATENTS

| | | | |
|---|---|---|---|
| 3,358,240 | 12/1967 | McKay | 329/112 X |
| 3,500,217 | 3/1970 | Allen | 329/112 X |

*Primary Examiner*—Roy Lake
*Assistant Examiner*—Lawrence J. Dahl
*Attorney*—C. Cornell Remsen, Jr., Walter J. Baum, Paul W. Hemminger, Percy P. Lantzy, Philip M. Bolton and Charles L. Johnson, Jr.

[57] ABSTRACT

A maximizing computational type FM demodulator to obtain optimum detection of an FM signal in the presence of noise. The FM signal at the IF frequency level is passed through a filter having a given bandwidth. The output signal of the filter is operated on to generate a signal $A_i \sin \phi_i$ and a signal $A_1 \cos \phi_i$, where $A_1$ equals the amplitude of the FM signal and $\phi_i$ equals the phase of an estimated noise with respect to an estimated FM signal for each sample. The signals $A_i \sin \phi_i$ an $A_i \cos \phi_i$ are sampled at a rate equal to the reciprocal of the bandwidth. A computer determines the value of $A_i$ and 100 $_i$ for each sample and produces an output signal for the demodulator the modulating signal with a minimum amount of additive noise.

2 Claims, 4 Drawing Figures

$$\eta(n,\theta) \equiv \frac{\sum_{i=1}^{n} i \sin \frac{i\theta}{n}}{\theta\left(n^2/3 + n/2 + 1/6\right)}$$

INVENTOR
GERALD RABOW
BY Alfred C. Hill
AGENT

INVENTOR
GERALD RABOW
BY Alfred C. Hill
AGENT

FREQUENCY MODULATION DEMODULATION SYSTEM

CROSS-REFERENCE TO RELATED APPLICATION

The present application is a continuation application of a copending application Ser. No. 827,183, filed May 23, 1969, now abandoned.

BACKGROUND OF THE INVENTION

This invention relates to frequency modulation (FM) receiver and, more particularly, to threshold extending FM demodulators employed therein.

One of the principal problems faced in the design of long range communication systems involves the recovery of modulated signals of relatively low amplitude from a relatively high amplitude of background noise which may result from sources either external to or within the receiver itself. This problem is of paramount importance, for example, in over-the-horizon communication systems, in communication systems employing space satellites as terminal or repeater stations, and in other broadband microwave systems in which the power available in the modulated signal applied to the receiver is limited by other considerations.

It is well known that increases in the signal-to-noise ratio of the demodulated signal can be obtained only by virtue of making a trade between such performance and the radio frequency bandwidth required for the transmission of the baseband or communication signal.

Transmission by FM represents one example of this trade. It is generally accepted that the greater the deviation of the carrier wave, the higher the signal-to-noise performance of the receiver may be. This process, however, cannot be carried out indefinitely and a threshold is reached at which any further increase in the deviation, and, thus, in the bandwidth required in the radio frequency spectrum, is ineffective to improve the signal-to-noise performance.

An FM receiver employing a special form of demodulator has been disclosed by J. G. Chaffee in U.S. Pat. No. 2,075,503, Mar. 30, 1937 and, variously referred to as a frequency modulation with feedback (FMFB) demodulator, as a frequency compression demodulator or a Chaffee-loop demodulator. The receiver employing this special form of demodulator includes conventional FM receiver circuits, such as a radio frequency amplifier, a mixer and voltage controlled oscillator, an IF (intermediate frequency) amplifier, a limiter, frequency discriminator and baseband amplifier, with the addition of a baseband filter coupled between the output of the frequency discriminator and the voltage controlled oscillator. Briefly, in this type of receiver the frequency of the local oscillator is caused by the feedback circuit to follow variations in the demodulated signal wave. This has the effect of reducing the modulation index in the input of the IF amplifier and will improve the signal-to-noise performance. Although it would appear that the feedback process could continue indefinitely with ever better results, this receiver, also, has a threshold beyond which signal-to-noise improvement does not occur.

As has been recognized in the prior art literature, the amount of threshold extension obtainable from the Chafee-loop technique is limited and existing designs of the implementation thereof together with efforts to optimize the various components of the FMFB demodulator and associated receiver components have approached this limit, but will not exceed this limit.

In the copending application of G. Rabow, Ser. No. 808,116 filed Mar. 18, 1969 there is disclosed a new type of FM demodulator providing an amount of threshold extension greater than the amount of threshold extension possible with the conventional FMFB demodulator and is referred to as an iterative FM demodulator. Briefly, the iterative FM demodulator employs a first FM demodulator, which may be of the feedback type, coupled to the input for an FM signal to be demodulated and an iteration circuit including a first means coupled to the input and the output of the first demodulator to combine the output signals thereof, a second FM demodulator coupled to the output of the first means, and a second means coupled to the output of each of the first and second demodulators to combine the output signals thereof and provide the demodulated output signal. One or more iteration circuits may be connected in cascade to each other and the output of the first iteration circuit to achieve still a further increase in the amount of threshold extension obtainable. However, the iteration demodulator like the conventional FMFB demodulator has a limit to the threshold extension obtainable therewith.

SUMMARY OF THE INVENTION

Therefore, an object of this invention is to provide a new type of FM demodulator providing the optimum amount of threshold extension.

Another object of this invention is to provide a maximizing FM demodulator enabling the achievement of optimum demodulation of a noisy FM signal.

A feature of this invention is the provision of a frequency modulation demodulation system comprising a source of FM signal to be demodulated, the FM signal including a carrier signal having a given frequency, a modulating signal and noise; first means coupled to the source having a given bandwidth; second means coupled to the first means to sample the output signal therefrom at a rate predeterminately related to the given bandwidth; and third means coupled to the second means responsive to the amplitude $A_i$ of the FM signal and the phase $\phi_i$ of an estimated noise with respect to an estimated FM signal for each sample to provide as an output signal for the system the modulating signal with a minimum amount of additive noise.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figures 1A, 1B:
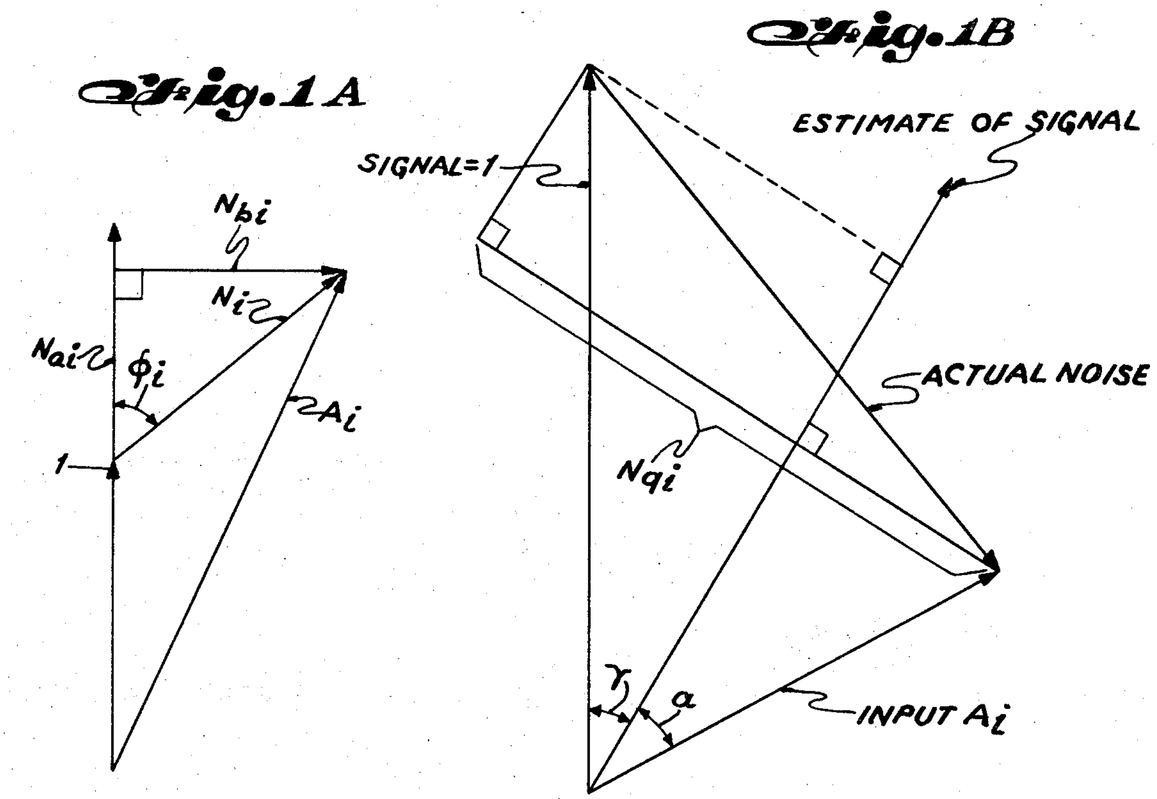
FIGS. 1A and 1B illustrate phasor diagrams of the maximizing FM demodulator in accordance with the principles of this invention.

The technique disclosed herein determines and enables the realization of optimum demodulation for a noise FM signal and is referred to as a maximizing FM demodulator. This demodulator incorporates a procedure that selects as the modulating signal the one from which the received carrier plus noise can be obtained with the minimum amount of additive noise and is implemented by a computational arrangement. It will be shown hereinbelow that improvements in threshold proportional to B, where B is the modulation index, can be obtained through this technique as compared to thresholds in the order of $\sqrt{B}$ for conventional FMFB demodulators, and this approach will, therefore, be most advantageous for high B.

In accordance with the principles of this invention the maximizing FM demodulator provides an output which is the ultimate performance of FM demodulation as a standard against which any demodulation scheme can be judged, and provides an implementation thereof by which the ultimate performance can be achieved if the application justifies the complexity. There are several instances where the application would justify the complexity, such as, a ground station having as its primary requirement the recovery of useful signals in the presence of large amplitude noise, such as, a tracking and/or telemetry ground station employed for planetary exploration and the like.

The input to a demodulator can be considered band-limited, where the bandwidth must be wide enough to include all the significant sidebands of the FM signal. A sufficient number of samples of the carrier plus noise then contains all the information that the demodulator receives. From these samples of carrier plus noise, the best estimate of the original modulating signal is then reconstructed. This will be that modulating signal which yields the observed samples with the addition of the least noise. The problem can then be stated as follows: find the modulating signal which yields the observed samples with a minimum of noise added.

The modulating signal can also be expressed in terms of the proper number of independent samples. The number of carrier plus noise samples is related to the number of signal samples by the ratio of the FM spectrum to the base-band, which can be taken to be 2 (B + 1). If amplitude and phase of carrier plus noise are measured, then B + 1 carrier plus noise samples are needed per signal sample. The problem is now broken into two steps. A special case is first considered in which there is a direct association of one signal sample with the B + 1 carrier plus noise samples, so that the optimum estimate of the signal is obtained from the proper manipulation of the B + 1 carrier plus noise samples. In the special case, the original modulating signal is constant for the duration of a sampling interval. The approach is then extended to the general case of any band-limited modulation, using the fact that the FM signal during the sampling interval is largely determined by the modulating signal at the corresponding sampling time.

For the derived optimum procedure of estimating the signal from the carrier plus noise samples, it will be shown that it is relatively easy to determine threshold performance. The threshold for this system turns out to be on the order of carrier-to-noise ratio = 10/B, the noise being taken in a bandwidth of 2(B + 1) times the base bandwidth.

Some sampling parameters will now be considered. If the audio signal bandwidth is $f_a$ (sec $^{-1}$) and the maximum frequency deviation is $Bf_a$ in hertz, then the signalling sampling rate is $2f_a$ (sec $^{-1}$) and the signal sampling time interval is $½f_a$ (sec). The RF (radio frequency) bandwidth will be assumed to be 2(B + 1) $f_a$, so that the signal plus noise within this bandwidth can be described by amplitude and phase samples at a 2(B + 1) $f_a$(sec $^{-1}$) sampling rate corresponding to a sampling interval of 1/2 (B + 1)$f_a$ (sec). The number $n$ of noise sample intervals per signal sample is then B ± 1, and the noise samples during a signal sample can be numbered $i$, where $i$ equals 0, 1, 2, . . . $n$.

For the special case let the transmitted signal be of constant value $f$, and let the problem be to estimate $f$ by observing the frequency-deviated signal plus noise, after passing through a filter of bandwidth 2 (B + 1) $f_a$, for a duration of $½f_a$.

Samples $i$ = O to $n$ of signal plus noise will be obtained, and the problem is to obtain an estimate of $f$ from these samples. Let: 1 equal the amplitude of the uncorrupted FM carrier; $N_i$ equal the estimated amplitude of any noise sample; $A_i$ equal the amplitude of any signal plus noise sample; $\phi_i$ equal the phase of the estimated noise samples with respect to the estimated signal (modulated carrier) sample; $\psi_i$ equal the phase of signal plus noise with respect to the estimated initial signal sample; and $K = \pi/(B+1)F_a$ = $(2\pi)$ (sample time) = the change in phase in radians in a sampling interval per hertz frequency offset. Then:

$$A_i \angle\psi_i = 1 \angle iKf + N_i \angle\phi_i \quad (1)$$

That is, the actual signal plus noise equals the estimated signal component plus the estimated noise component. If $N_{ai}$ and $N_{bi}$ are, respectively, the components of $N_i$ in phase and in quadrature with the estimated signal as illustrated in FIG. 1A then $$A_i = \sqrt{(1+N_{ai})^2 + N_{bi}^2} \quad (2)$$

and $$\psi_i - \psi_{i-1} = Kf + \cos^{-1}\left(\frac{1+N_{ai}}{A_i}\right) - \cos^{-1}\left(\frac{1+N_{ai-1}}{A_{i-1}}\right) \quad (3)$$

since the change in the angle is caused both by the change of the angle between the estimated noise vector and the reference and by the change in the reference.

To find that value of $f$ for which the observed signal plus noise is obtained with the minimum required additive noise, minimize $$\sum_{i=0}^{n} (N_{ai}^2 + N_{bi}^2) \quad (4)$$

From equation (2) $N_{ai}^2 + N_{bi}^2 = A_i^2 - 1 - 2N_{ai}$ (5)

hence, equation (4) is equivalent to equation (6)

Maximize $$\sum_{i=0}^{n} N_{ai} \quad (6)$$

From equation (3)

$$\cos^{-1}\left(\frac{1+N_{ai}}{A_i}\right) = \psi_o - Kif + K\sum_{j=1}^{i} f_i \quad (7)$$

where $f_j = \psi_j - \psi_{j-1}/K$ and can be interpreted as measured frequency, hence $$\sum_{i=0}^{n} N_{ai} = \sum_{i=0}^{n}\left\{A_i \cos\left[\psi_0 - K\left(if - \sum_{j=1}^{i} f_j\right)\right] - 1\right\} \qquad (8)$$

The solution for the maximization of equation (8) depends upon whether $\psi_o$ is a variable whose optimum value is to be found, or whether the initial phase of the signal is known from previous measurements, in which case $\psi_o$ can be taken as O. For the case where $\psi_o = o$, the maximum value of equation (8) is obtained by maximizing with respect to $f$ as follows $$\sum_{i=0}^{n} A_i \cos K\left(if - \sum_{j=1}^{i} f_j\right) \qquad (9)$$

which yields $$\sum_{i=0}^{n} iA_i \sin K\left(if - \sum_{j=1}^{i} f_j\right) = 0 \qquad (10)$$

For small angles, this reduces to $$f = \frac{\sum_{i=0}^{n} iA_i \sum_{j=1}^{i} f_j}{\sum_{i=0}^{n} i^2 A_i} \qquad (11)$$

If $\psi_o$ is a variable to be determined, the maximum of equation (8) can be obtained by differentiating with respect to both $f$ and $\psi_o$ which yields $$\left.\begin{aligned} &\sum_{i=0}^{n} iA_i \sin\left[\psi_0 - K\left(if - \sum_{j=1}^{i} f_j\right)\right] = 0 \\ &\sum_{i=0}^{n} A_i \sin\left[\psi_0 - K\left(if - \sum_{i=1}^{i} f_j\right)\right] = 0 \end{aligned}\right\} \qquad (12)$$

For small angles, equation (12) yields $$f = \frac{\left[\sum_{i=0}^{n} A_i\right]\left[\sum_{i=0}^{n} iA_i \sum_{j=0}^{i} f_j\right] - \left[\sum_{i=0}^{n} iA_i\right]\left[\sum_{i=0}^{n} A_i \sum_{j=1}^{i} f_j\right]}{\left[\sum_{i=0}^{n} A_i\right]\left[\sum_{i=0}^{n} i^2 A_i\right] - \left[\sum_{i=0}^{n} iA_i\right]} \qquad (13)$$

The signal-to-noise S/N output versus carrier-to-noise C/N input for the demodulation process just described will now be calculated, first for large S/N (above threshold) conditions, and then adjusted to be applicable for small S/N as well. Let the average signal power out in the absence of noise be $B^2 f_a^2/2$. This corresponds to sinusoidal modulation with peak deviation of $Bf_a$. To calculate the noise in the absence of signal corresponding to equation (11), note that $A_i \approx 1$ for large S/N, so that equation (11) reduces to $$f = \frac{\sum_{i=0}^{n} i \sum_{j=1}^{i} f_j}{\sum_{i=0}^{n} i^2} = \frac{\sum_{i=0}^{n} i \sum_{j=1}^{i} f_j}{n^3/3 + n^2/2 + n/6} \qquad (14)$$

In the absence of signal, the term $\sum_{j=1}^{n} f_j$ is merely 1/K times the quadrature component of the noise voltage and is, hence, $(B+1) f_a N_j/\pi\sqrt{2}$ Hence, the mean square value (indicated by superscript bar) of output noise is $$\overline{f_N{}^2} = \frac{(B+1)^2 f_a^2 \overline{N_j{}^2} \sum_{i=0}^{n} i^2}{2^2\pi(n^3/3+n^2/2+n/6)^2} = \frac{(B+1)^2 f_a^2 \overline{N_j{}^2}}{2^2\pi(n^3/3+n^2/2+n/6)} = \frac{f_a^2 \overline{N_j{}^2}}{2^2\pi(n/3+1/2+1/6n)} \qquad (15)$$

hence, $$S/N]_{out} = \frac{B^2\pi^2(n/3+1/2+1/6n)}{\overline{N_j{}^2}} = \frac{B^2\pi^2}{3\overline{N_j{}^2}}\left(B + 5/2 + \frac{1}{2B+2}\right) \qquad (16)$$

$$C/N]_{in} = \frac{1}{\overline{N_j{}^2}} \qquad (17)$$

$$\frac{S/N]_{out}}{C/N]_{in}} = \frac{\pi^2}{3} B^3\left[1 + \frac{5}{2B} + \frac{1}{2B^2+2B}\right] = 3.3B^3\left[1 + \frac{5}{2B} + \frac{1}{2B^2+2B}\right] \qquad (18)$$

A similar calculation corresponding to equation (13) yields $$\frac{S/N]_{out}}{C/N]_{in}} = 0.82B^3\left[1 + \frac{1}{B} - \frac{1}{B(B+1)^2}\right] \qquad (19)$$

Comparing equations (18) and (19) with the conventional FM improvement factor of 3 $B^3$, it is seen that equation (18) gives greater improvement while equation (19) gives lesser improvement. The interpretation is that equation (19) is worse than the conventional improvement because no use is made of phase information from previous samples, while equation (18) is too optimistic because of the assumption that this phase information is error free. It is presumed that if a correction were applied to equation (18) to take into account error in the phase information, the conventional FM improvement factor would be obtained.

The deterioration in output signal-to-noise when noise is no longer small compared to the signal can be determined with the held of FIG. 1B. Comparing the phasor diagram of FIG. 1B the equation (10), it will be seen that the contribution to the estimate of $f$ made by the $i^{th}$ sample is $A_i \sin \alpha_i$, which from the diagram is further seen to be equal to $N_{qi} - \sin\gamma_i$, where $N_{qi}$ is a component of the actual noise. In the small noise approximation, this contribution would have been $N_{qi} - \gamma_i$. In other words, whereas equation (10) requires $$\sum_{i=0}^{n} [N_{qi} - \sin\gamma_i] = o \text{ or } \sum_{i=0}^{n} iN_{qi} = \sum_{i=0}^{n} i \sin\gamma_i \qquad (20)$$

the small noise approximation solves $$\sum_{i=0}^{n} iN_{qi} = \sum_{i=0}^{n} i\gamma_i \qquad (21)$$

Equation (20) can be written as $$\sum_{i=0}^{n} iN_{qi} = \eta \sum_{i=0}^{n} i\gamma_i \qquad (22)$$

where $$\eta = \frac{\sum_{i=0}^{n} i \sin\gamma_i}{\sum_{i=0}^{n} i\gamma_i} \qquad (23)$$

Figure 2:
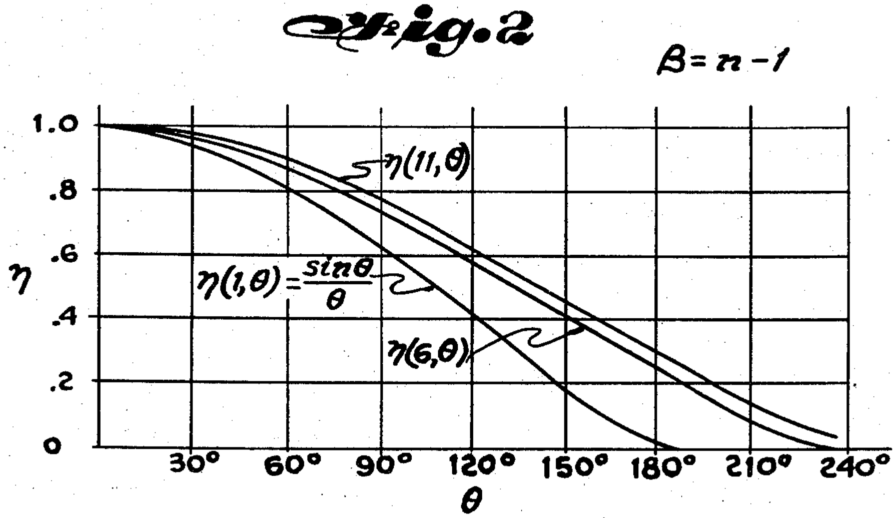
FIG. 2 illustrates several curves representing the deterioration factor for large noise angles.

It will be seen that equation (22) differs from equation (21) only by $\eta$, which means that the large noise calculation is equivalent to the small noise calculation if the effective noise voltages in the latter case are raised by $1/\eta$. In other words, the output signal-to-noise power is that calculated from the small noise formula multiplied by $\eta^2$. It is seen that $\eta$ is a function only of $\gamma_i$, that is, only of output signal-to-noise ratio. Thus, if $$\frac{S/N]_{out}}{C/N]_{in}} = 3B^3 \qquad (24)$$

holds for the small noise case, then $$C/N]_{in} = \frac{S/N]_{out}}{3B^3\eta^2},\ \text{where}\ \eta = \eta(S/N]_{out}) \quad (25)$$

directly relates output - and input signal-to-noise ratios. The function $$\eta(n, \theta) \equiv \frac{\sum_{i=1}^{n} i \sin (i\theta/n)}{\theta(n^2/3+n/2+1/6)}$$

is plotted in FIG. 2. This function is fairly insensitive toB.

The $S/N]_{out}$ can be obtained by noting that the peak signal swing is $nKBf_a = \pi B$ radians, or 180 B degrees. Taking average signal power to be half peak signal power, $$S/N]_{out} = ½ (\pi B/\theta)^2 \quad (26)$$

Combining equations (25) and (26) gives $$C/N]_{in} = \pi^2/6B(\eta\theta)^2 \quad (27)$$

From $\eta(11,\theta)$ in FIG. 2, the maximum value of $\eta\theta$ can be determined as $0.41\pi$, which occurs at about $\theta$=110°, $\eta$=0.67. The corresponding righthand side of equation (27) becomes $1/B$. This means that $C/N]_{in}$ for any sample must be greater than $1/B$ for the maximizing procedure to yield a meaningful solution. The average value of $C/N]_{in}$ should be sufficiently large so that it almost never falls below $1/B$. That is, the threshold value of average input carrier-to-noise ratio is on the order of 10/B to 20/B. This gives a threshold extension on the order of B relative to a conventional FMFB demodulator.

Now let us consider an extension of the above to the general case. In the special case, the frequency deviation of the uncontaminated signal over any sampling interval was constant. In the general case, this is altered on two accounts. Assume that the modulating signal can be described by its sample values. For simplicity, assume that the band-limited signal is significantly affected only by three samples: the one corresponding to the sampling interval ($f$), the one immediately proceeding ($f_-$), and the one immediately following ($f_+$). Even the deviation corresponding to sample $f$, however, is not constant over the sampling intervals but varies according to sin X/X. Hence, equation (1) takes the form $$A_i \angle\psi i = 1 \angle K(Q_i f_- + R_i f + S_i f_+) + N_i \angle\phi i \quad (28)$$

where $R_i$, $Q_i$, and $S_i$ are functions of $i$ which can be determined from the knowledge of how the samples make up the transmitted wave shape, e.g., in a sin X/X fashion for the ideal band-limited case. The expression corresponding to equation (9) to be maximized then becomes $$\sum_{i=0}^{n} A_i \cos K\left(Q_i f_- + R_i f + S_i f_+ - \sum_{j=1}^{i} f_i\right) \quad (29)$$

Since the major influence on equation (29) is $f$, the solution can be obtained by successive approximations. That is, solve equation (29) assuming $f_+ = o$. Then using this approximation for $f$, obtain an approximate solution for the following sampling interval. With this value of $f_+$, a better solution can now be obtained for $f$. This procedure is continued successively to achieve the desired results. The results of the signal-to-noise ratio calculations made for the special case should not be significantly changed for the general case, since the major contributing terms in the general case are the same as for the special case.

Figure 3:
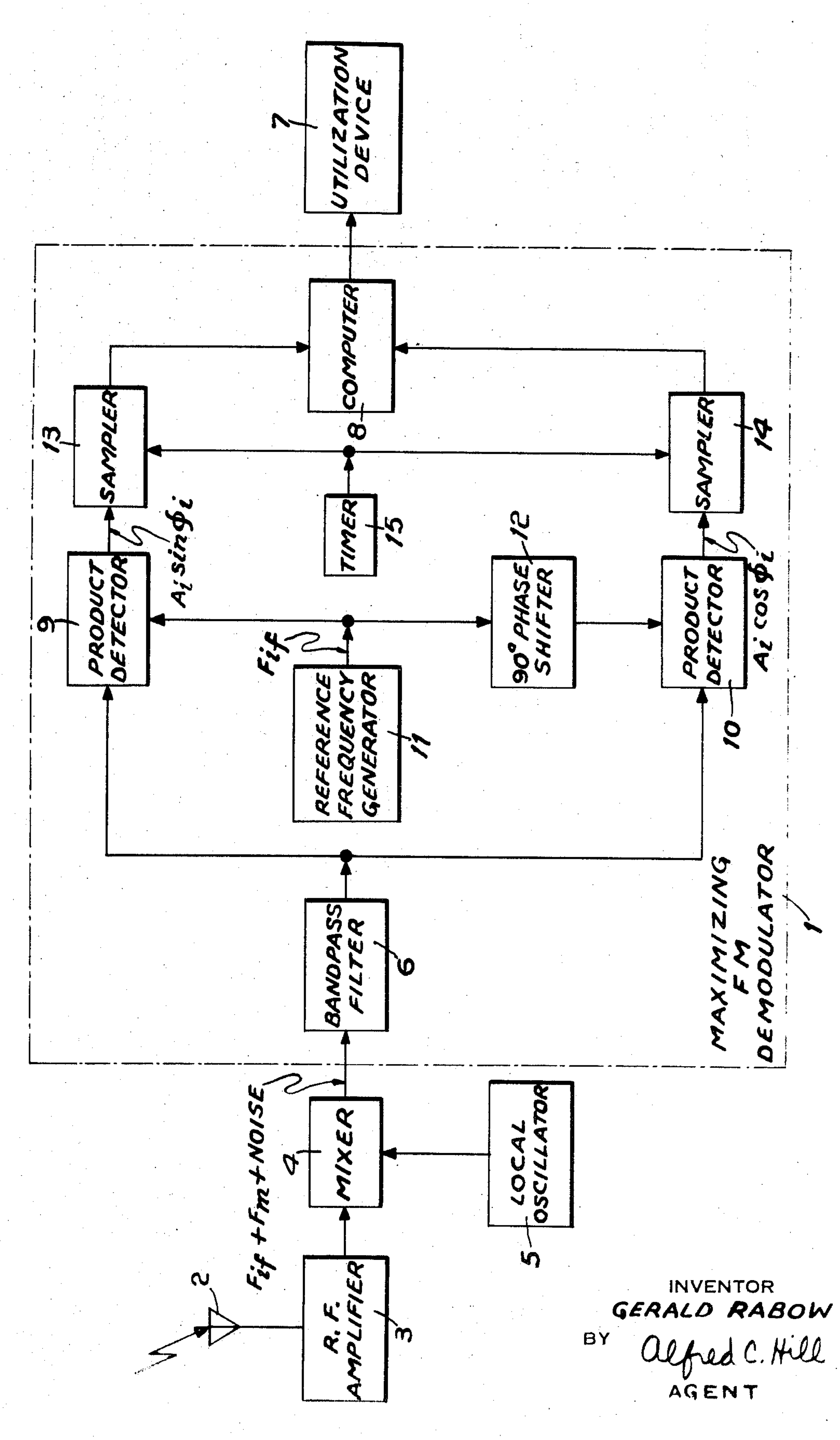
FIG. 3 is a block diagram of an FM receiver incorporating the maximizing FM demodulator in accordance with the principles of this invention.

Referring to FIG. 3, there is disclosed therein an FM receiver utilizing maximizing FM demodulator 1 in accordance with the principles of this invention. The frequency modulated signal input to demodulator 1 includes an IF carrier frequency modulated by a modulating signal $F_m$ and noise and is derived in the conventional manner by receiving an RF carrier frequency modulated by the modulating signal $F_m$ and noise on antenna 2. The signal received by antenna 2 is applied to RF amplifier 3 and to a frequency heterodyning arrangement including mixer 4 and local oscillator 5 to generate the IF carrier $F_{if}$ frequency modulated by the modulating frequency $F_m$ and noise for application to the input of demodulator 1. The output of mixer 4 is coupled to bandpass filter 6 which passes only that band of frequencies containing significant signal energy.

In the general case, the output of filter 6 is sampled at a rate equal to the reciprocal of the filter bandwidth. At each sampling interval the value of amplitude $A_i$ and phase $\phi_i$ are measured and employed by a computer to provide the most likely modulating signal at the output of demodulator 1 for utilization in utilization device 7. The most likely modulating signal is that modulating signal having a minimum amount of additive noise.

Since it is easier to measure $A_i \sin \phi_i$ and $A_i \cos \phi_i$, computer 8 can readily determine the value of $A_i$ and $\phi_i$ by employing trigometric relations to the phasor diagram of FIG. 1A wherein the value of $A_i$ can be obtained by taking the square root of the sum of the squares, $A_i = \sqrt{(A_i \sin \phi_i)^2 + (A_i \cos \phi_i)^2}$, and the value of $\phi_i$ can be obtained by taking the arctan of the quotient, $\phi_i = \arctan A_i \sin \phi_i / A_i \cos \phi_i$ and provide as its output the most likely modulating signal.

The quantities $A_i \sin \phi_i$ and $A_i \cos \phi_i$ are obtained, respectively, from product detectors 9 and 10, each of which have as inputs the filtered signal at the output of filter 6 and a reference signal in the form of a sine wave at the IF frequency as generated by generator 11. The output of generator 11 is coupled directly to detector 9 to produce the signal $A_i \sin \phi_i$ and through a 90° phase shifter 12 to product detector 10 to produce the signal $A_i \cos \phi_i$. The outputs of detectors 9 and 10 are coupled, respectively, to samplers 13 and 14. The sampling timing is controlled by timer 15 at a rate equal to the reciprocal of the bandwidth of filter 6. Computer 8 accepts the output signals of the samplers 13 and 14 and computes the most likely modulating signal as described hereinabove, for example, by maximizing equation (29). The output from computer 8 to device 7 will be the computed estimate of the most likely modulating signal.

While I have described above the principles of my invention in connection with specific apparatus, it is to be clearly understood that this description is made only by way of example.

I claim:

1. A frequency modulation demodulation system comprising at least:
   - a source of frequency modulated signal to be demodulated, said modulated signal including a carrier signal having a given frequency, a modulating signal and noise;
   - a bandpass filter having an input coupled to said source, a passband equal to a given limited bandwidth and an output;

a signal sampler having input means coupled to the output of said filter to sample the output signal therefrom at a rate equal to the reciprocal of said given limited bandwidth and output means; and a computer having input means coupled to the output means of said signal sampler and output, said computer being responsive to a plurality of samples of said sampled bandwidth limited signal received from said sampler to calculate for each sample of said plurality of samples the value of the amplitude $A_t$ of said modulated signal and the value of the phase $\phi_t$ of an approximated noise as calculated from previous ones of said plurality of said samples with respect to an approximated modulated signal as calculated from previous ones of said plurality of said samples and to calculate from said value of amplitude $A_t$ and said value of the phase $\phi_t$ for each of said plurality of samples said modulating signal having a minimum amount of additive noise, said modulating signal having said minimum amount of additive noise being provided at the output of said computer to provide an output signal for said system.

2. A frequency modulation demodulation system comprising:

a first source of frequency modulated signal to be demodulated, said modulated signal including a carrier signal having a given frequency a modulating signal and noise;

a bandpass filter having an input coupled to said first source, a passband equal to a given limited bandwidth and an output;

a second source of a reference signal having a frequency equal to said given frequency;

a first product detector having an output, a first input coupled to the output of said filter and a second input coupled to said second source to produce a first signal proportional to $A_t \sin \phi_t$ at the output of said first detector;

a 90° phase shifter having an input coupled to said second source and an output;

a second product detector having an output, a first input coupled to the output of said filter and a second input coupled to the output of said phase shifter to produce a second signal proportional to $A_t \cos \phi_t$ at the output of said second detector;

a third source of a sampling signal having a rate equal to the reciprocal of said given limited bandwidth;

a first sampler having an output, a first input coupled to said third source and a second input coupled to the output of said first detector to sample said first signal; and a second sampler having an output, a first input coupled to said second source and a second input coupled to the output of said second detector to sample said second signal; and a computer having an output, a first input coupled to the output of said first sampler and a second input coupled to the output of said sampler, said computer being responsive to a plurality of samples of the output signals of each of said first and second samplers to calculate for each sample of said plurality of samples the value of the amplitude $A_t$ of said modulated signal and the value of the phase $\phi_t$ of an approximated noise as calculated from previous ones of said plurality of said samples with respect to an approximated modulated signal as calculated from previous ones of said plurality of said samples and to calculate from said value of amplitude $A_t$ and said value of said phase $\phi_t$ for each of said plurality of samples said modulating signal having a minimum amount of additive noise, said modulating signal having said minimum amount of additive noise being provided at the output of said computer to provide an output signal for said system.

* * * * *